United States Patent
Ota et al.

(10) Patent No.: US 7,563,195 B2
(45) Date of Patent: Jul. 21, 2009

(54) SPEED CHANGE CONTROL DEVICE AND SPEED CHANGE CONTROL METHOD FOR AUTOMATIC TRANSMISSION FOR VEHICLE

(75) Inventors: Keisuke Ota, Toyota (JP); Hiromichi Kimura, Okazaki (JP); Toshimitsu Sato, Toyota (JP); Koji Hattori, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 414 days.

(21) Appl. No.: 11/565,988

(22) Filed: Dec. 1, 2006

(65) Prior Publication Data
US 2007/0149354 A1 Jun. 28, 2007

(30) Foreign Application Priority Data
Dec. 27, 2005 (JP) ............................. 2005-375310

(51) Int. Cl.
*B60W 10/04* (2006.01)
(52) U.S. Cl. .................... 477/107; 477/110; 477/111
(58) Field of Classification Search ................ 477/107, 477/110, 111, 115, 121
See application file for complete search history.

(56) References Cited
U.S. PATENT DOCUMENTS
5,782,711 A * 7/1998 Tsutsui et al. ............... 477/156
6,254,508 B1 * 7/2001 Kojima et al. ............... 477/109
7,500,932 B2 * 3/2009 Katakura et al. ............ 475/123

FOREIGN PATENT DOCUMENTS
| JP | 10-196776 | 7/1998 |
| JP | 2000-142182 | 5/2000 |
| JP | 2004-332879 | 11/2004 |
| WO | WO 03/029698 A1 * | 4/2003 |

* cited by examiner

*Primary Examiner*—Ha D. Ho
(74) *Attorney, Agent, or Firm*—Oblon, Spivak, McClelland, Maier & Neustadt, P.C.

(57) ABSTRACT

Since there are provided an inertia phase final period decision unit which decides whether or not the final period of the inertia phase of a speed change is currently occurring, a return control unit which, taking an affirmative result of this decision as a starting condition, performs return control in order to return from the torque down control by gradually decreasing the amount of decrease of output torque, a speed change progression decision unit which, during this return control from the torque down control, decides whether or not the speed change is progressing, and a resumption control unit which resumes the torque down control if the result of this decision is negative, accordingly, during the return control from the torque down control, by resuming the torque down control when there is no progression with the speed change.

10 Claims, 7 Drawing Sheets

|  | C1 | C2 | B1 | B2 | B3 | F1 |
|---|---|---|---|---|---|---|
| 1ST | ○ |  |  | ◎ |  | △ |
| 2ND | ○ |  | ○ |  |  |  |
| 3RD | ○ |  |  |  | ○ |  |
| 4TH | ○ | ○ |  |  |  |  |
| 5TH |  | ○ |  |  | ○ |  |
| 6TH |  | ○ | ○ |  |  |  |
| R |  |  |  | ○ | ○ |  |
| N |  |  |  |  |  |  |

◎ OPERATED DURING ENGINE BRAKING
△ OPERATED ONLY DURING DRIVING

SPEED CHANGE CONTROL DEVICE AND SPEED CHANGE CONTROL METHOD FOR AUTOMATIC TRANSMISSION FOR VEHICLE

INCORPORATION BY REFERENCE

The disclosure of Japanese Patent Application No. 2005-375310 filed on Dec. 27, 2005 including the specification, drawings and abstract is incorporated herein by reference in its entirety.

BACKGROUND OF THE INVENTION

1. Field of the Invention

The present invention relates to a speed change control device and a speed change control method for an automatic transmission for a vehicle, and, in particular, relates to a speed change control device and a speed change control method for an automatic transmission for a vehicle, which, during speed changing, suppress the time period until speed changing is completed becoming drawn out due to the accelerator being stepped down upon during torque down control, or the like.

2. Description of the Related Art

An automatic transmission for a vehicle which speed changes output rotation transmitted from a power source and outputs the resulting speed changed rotation may be employed in various types of vehicle. With this kind of automatic transmission it is per se known to perform so called torque down control, in which the output torque of the power source is temporarily reduced during the inertia phase of speed changing. For example, the speed change control device of the automatic transmission described in Japanese Laid-Open Patent Publication 2000-142182 is of this type. According to the technique disclosed in that document, by temporarily reducing the output torque of the power source based upon a torque down amount which corresponds to the input torque of the automatic transmission and the like during the inertia phase of speed changing, it is made possible to implement an appropriate speed change in a short time period, even if the engagement force of an engagement device which participates in the speed change is comparatively small.

Incidentally, in this prior art technique, during speed changing, return control is performed in which a return is executed from torque down control after the inertia phase period. Although, in this return control, taking the torque down amount at the start of return as a base, this torque down amount is gradually decreased to zero, if, during upshifting, this torque down control is performed according to the above described prior art technique during the inertia phase, then there is a risk that if, during the return control from this torque down control, the accelerator opening amount is increased due to stepping down upon the accelerator being performed or the like, then the actual torque down amount may become deficient as compared to the torque down amount which is required, and sometimes stagnation or retrogression of the speed change operation may be caused (which is a malfunction), so that the time period until speed changing is completed may become drawn out.

SUMMARY OF THE INVENTION

The object of the present invention is to provide a speed change control device and a speed change control method for an automatic transmission for a vehicle, which implement speed changing within a short time period, while ensuring provision of the required torque down amount for speed changing.

In order to achieve such an object, the present invention proposes, for an automatic transmission for a vehicle which speed changes and outputs the rotation output transmitted from a power source and, in the inertia phase of upshift speed changing, performs torque down control by reducing the output torque of the power source by a predetermined amount, a speed change control device comprising: an inertia phase final period decision unit which decides whether or not the final period of the inertia phase is currently occurring; a return control unit which, if it has been decided by the inertia phase final period decision unit that the inertia phase is in its final period, performs return control by gradually decreasing the amount of decrease of output torque by the torque down control; a speed change progression decision unit which, during the return control, decides whether or not the speed change is progressing; and a resumption control unit which resumes the torque down control, if it has been decided by the speed change progression unit that the speed change is not progressing.

According to this concept, by resuming the torque down control during return control from the torque down control if the speed change is not progressing, it is possible to ensure the required torque down amount for the speed change even if stepping down upon the accelerator pedal is performed, and it is possible therefore appropriately to suppress drawing out of the time period until speed changing is completed. In other words it is possible to provide a speed change control device for an automatic transmission for a vehicle which implements speed changing within a short time period, while ensuring the necessary torque down amount for speed changing.

Furthermore, there may also be provided an elapsed time calculation unit which calculates the elapsed time from the resumption of the torque down control by the resumption control unit, in which case the return control unit should take, as the starting condition for the return control, that it is decided by the inertia phase final period decision unit that the inertia phase is in its final period, and moreover that the elapsed time as calculated by the elapsed time calculation unit has become greater than or equal to a predetermined time period. Since, according to this concept, when resuming the torque down control, it is possible to continue this torque down control for greater than or equal to the predetermined time period, accordingly, along with it being possible reliably to ensure the necessary torque down amount for speed changing, it is also possible reliably to suppress drawing out of the time period until speed changing is completed.

Moreover, it would also be possible for the inertia phase final period decision unit to decide that the inertia phase of the speed change is in its final period, based upon the input rotational speed to the automatic transmission dropping below a decision value which is set just a predetermined value higher than the synchronization rotational speed, and for the speed change progression decision unit to decide that the speed change is not progressing, based upon the input rotational speed to the automatic transmission rising above the decision value. According to this concept, it is possible to decide upon the final period of the inertia phase of the speed change, and upon its progression, in a practical manner.

Yet further, the speed change progression decision unit may decide that the speed change is not progressing, based upon the state in which the rate of change of the input rotational speed to the automatic transmission is greater than or equal to zero being maintained for a predetermined time period. According to this concept, it is possible to decide upon the progression of the speed change in a practical manner.

Even further, the torque down amount may be determined from a relationship determined in advance, based upon the input torque and/or the input shaft rotational speed to the automatic transmission. According to this concept, during an upshift speed change, the output torque of the power source is appropriately reduced in the inertia phase.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following, an embodiment of the present invention will be explained in detail with reference to the drawings.

Figure 1:
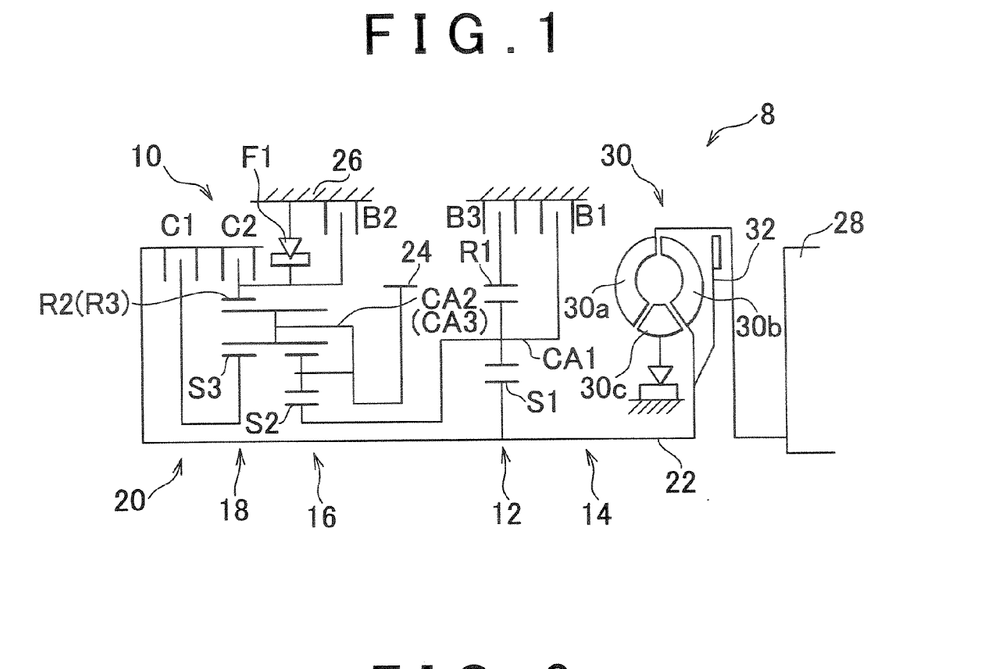
FIG. 1 is a schematic figure showing a power transmission device provided with an automatic transmission for a vehicle, to which the present invention is applied.
Figure 2:
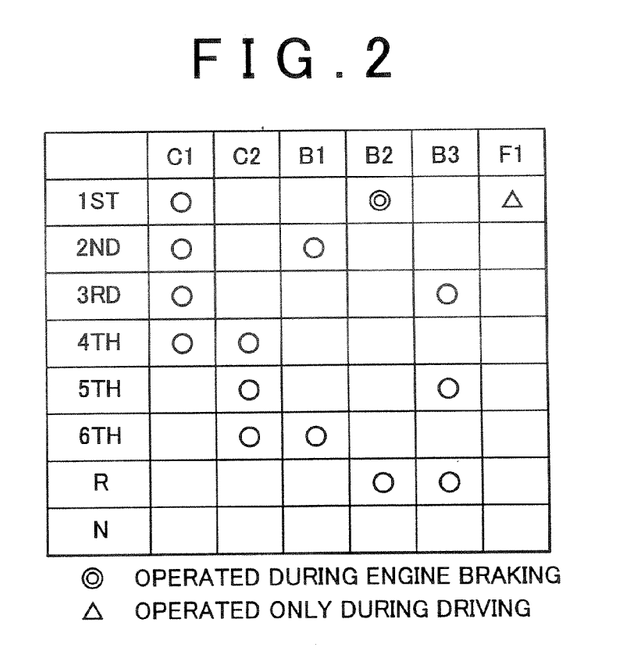
FIG. 2 is an operation table for explanation of the operational states of engagement elements when implementing a plurality of speed stages with the automatic transmission for a vehicle of FIG. 1.

FIG. 1 is a schematic figure showing a power transmission device 8, to which the present invention is applied, and FIG. 2 is an operation table for explanation of the operational states of engagement elements when implementing a plurality of speed stages with the automatic transmission 10 for a vehicle (hereinafter simply termed an "automatic transmission") which is provided to this power transmission device 8.

This automatic transmission 10 may be appropriately used for an FF vehicle or the like, being mounted in the left and right direction (the transverse direction) of the vehicle. This automatic transmission 10 comprises a first speed change section 14 which is principally built as a first planetary gear device 12 of the single pinion type, and a second speed change section 20, mounted upon the same axial line, which is principally built as a Ravingeau type structure having, principally, a second planetary gear device 16 of the double pinion type and a third planetary gear device 18 of the single pinion type. The rotation of an input shaft 22 is speed changed and outputted from an output rotation member 24.

The input shaft 22 described above may be considered as being an input member, and, in this embodiment, it is a turbine shaft of a torque converter 30 which is rotationally driven by an engine 28, which is the power source used for propelling the vehicle along the road. Furthermore, the above described output rotation member 24 may be considered as being an output member of this automatic transmission 10, and functions as an output gear wheel which is meshed with a differential driven gear (a large diameter gear wheel) 36 for transmitting power to a differential gear wheel device 34 shown in FIG. 4, in other words as a differential drive gear. Thus, the output of the above described engine 28 is transmitted via the torque converter 30, the automatic transmission 10, the differential gear wheel device 34, and a pair of wheel shafts 38, to a pair of drive wheels 40 of the vehicle (its front wheels).

It should be understood that this automatic transmission 10 is structured approximately symmetrically with respect to its center line; and accordingly its lower half below its center line in FIG. 1 is omitted.

The engine 28 described above is an internal combustion engine such as a gasoline engine or the like, which generates drive force by combustion of fuel injected into its cylinders. Furthermore, the torque converter 30 described above comprises a pump blade wheel 30a which is linked to the crank shaft of the above described engine 28, a turbine blade wheel 30b which is linked to the input shaft 22 of the above described automatic transmission 10, and a stator blade wheel 30c which is linked to the housing 26 of the above described automatic transmission 10 (the casing of the speed change mechanism 10) via a unidirectional clutch. The torque converter 30 is a fluid power transmission device which transmits power which has been generated by the above described engine 28 to the above described automatic transmission 10 via a fluid.

Furthermore a lock up clutch 32, which is a direct coupling clutch, is provided between the above described pump blade wheel 30a and turbine blade wheel 30b. This lock up clutch 32 can be put into an engaged state, a slipping state, or a released state, according to oil pressure control or the like. By putting this lock up clutch 32 into the perfectly engaged state, it is possible to make the above described pump blade wheel 30a and turbine blade wheel 30b rotate together as one.

The operation table of FIG. 2 sums up the relationships between the various speed stages which are implemented by this automatic transmission 10 and the operational states of clutches C1 and C2 and brakes B1, B2, and B3. In this operation table, "○" means "engaged", "⊙" means "engaged only during engine braking" and blank means "released". The clutches C1 and C2 and brakes B1, B2, and B3 (simply referred to as clutches C and brakes B when no particular distinction is being drawn) which are provided to this automatic transmission 10 are oil pressure type friction engagement devices, such as multi-plate type clutches or brakes, which are controlled to be engaged by oil pressure actuators or the like. By excitation, non-excitation, or electrical current control of linear solenoid valves SL1 through SL5 of an oil pressure control circuit 42 which will be described hereinafter with reference to FIG. 3, along with changing these devices over between their engaged and released states, the transient oil pressure during their engagement and release and the like can also be controlled.

With this automatic transmission 10, along with it being possible to implement a first speed stage "1st" through a sixth speed stage "6th" according to combinations of the engaged states of the various rotation elements (sun gears S1 through S3, carriers CA1 through CA3, and ring gears R1 through R3) of the first speed change section 14 and the second speed change section 20, it is also possible to implement a backward gear speed change state "Rev".

As shown in FIG. 2, for example as forward gear stages: by engaging the clutch C1 and the brake B2, the first gear speed stage "1st" can be implemented; by engaging the clutch C1 and the brake B1, a second gear speed stage "2nd" can be implemented; by engaging the clutch C1 and the brake B3, a third gear speed stage "3rd" can be implemented; by engaging the clutch C1 and the clutch C2, a fourth gear speed stage "4th" can be implemented; by engaging the clutch C2 and the brake B3, a fifth gear speed stage "5th" can be implemented; and, by engaging the clutch C2 and the brake B1, the sixth gear speed stage "6th" can be implemented.

Moreover, by engaging the brake B2 and the brake B3, the backward gear speed stage "Rev" can be implemented; while, by releasing all of the clutches C and brakes B, the transmission can be put into the neutral state. With the automatic transmission 10 of this embodiment, since a one-way clutch F1 is provided in parallel with the brake B2 which implements the first speed change stage "1st", accordingly when starting off (during acceleration), there is no need to engage the brake B2. Furthermore, the speed change ratio of each of the speed change stages is determined appropriately by the gear ratios ρ1, ρ2, and ρ3 of the first planetary gear device 12, the second planetary gear device 16, and the third planetary gear device 18 (equal to the number of teeth on the sun gear divided by the number of teeth on the ring gear).

Figure 3:
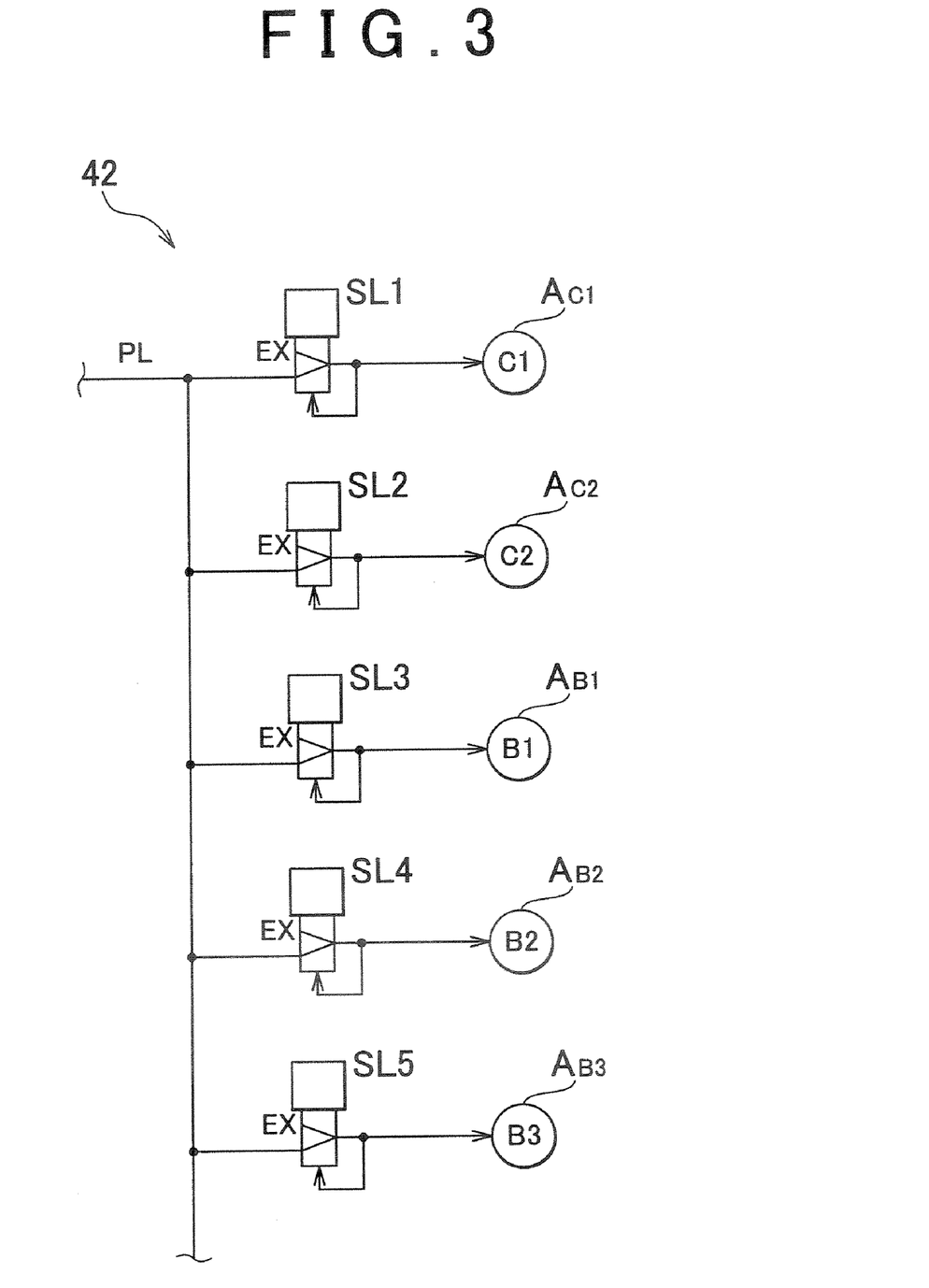
FIG. 3 is a circuit diagram showing a portion of an oil pressure control circuit provided to the power transmission device of FIG. 1 which is related to linear solenoid valves, for implementing a plurality of speed stages with the automatic transmission for a vehicle of FIG. 1.

FIG. 3 is a circuit diagram showing a portion of an oil pressure control circuit 42 provided to the power transmission device 8 which is related to the linear solenoid valves SL1, SL2, SL3, SL4, and SL5. As shown in this FIG. 3, in the above described oil pressure control circuit 42, a line oil pressure PL serves as a source pressure, and this line oil pressure is pressure regulated by the linear solenoid valves SL1 through SL5 according to command signals from an electronic control unit 44, with the resulting pressures then being supplied as engagement pressures to respective oil pressure actuators (oil pressure cylinders or the like) $A_{C1}$, $A_{C2}$, $A_{B1}$, $A_{B2}$, and $A_{B3}$ of the clutches C1 and C2 and brakes B1, B2, and B3 which are provided to this automatic transmission 10. This line oil pressure PL is pressure regulated from the output pressure of a mechanical oil pump which is rotationally driven by the engine 28, or of an electromagnetic type oil pump, by a relief type pressure regulation valve or the like (not shown in the figures), to a value which corresponds to engine load or the like, as represented by an accelerator pedal actuation amount $A_{CC}$ or a throttle opening amount $\theta_{TH}$.

Furthermore, the above described linear solenoid valves SL1 through SL5 are all fundamentally of the same structure. By the state of communication between an input port and an output port or a drain port of each of these linear solenoid valves SL1 through SL5 being varied according to the electromagnetic force of a solenoid, its output pressure (an engagement pressure) is pressure regulated and controlled, and is supplied to the abovementioned oil pressure actuators $A_{C1}$, $A_{C2}$, $A_{B1}$, $A_{B2}$, and $A_{B3}$. Thus, the solenoid which is provided to each of the linear solenoid valves SL1 through SL5 is independently excited by the electronic control unit 44, and thereby the oil pressure of each of the oil pressure actuators $A_{C1}$, $A_{C2}$, $A_{B1}$, $A_{B2}$, and $A_{B3}$ comes to be independently pressure regulated and controlled.

Figure 4:
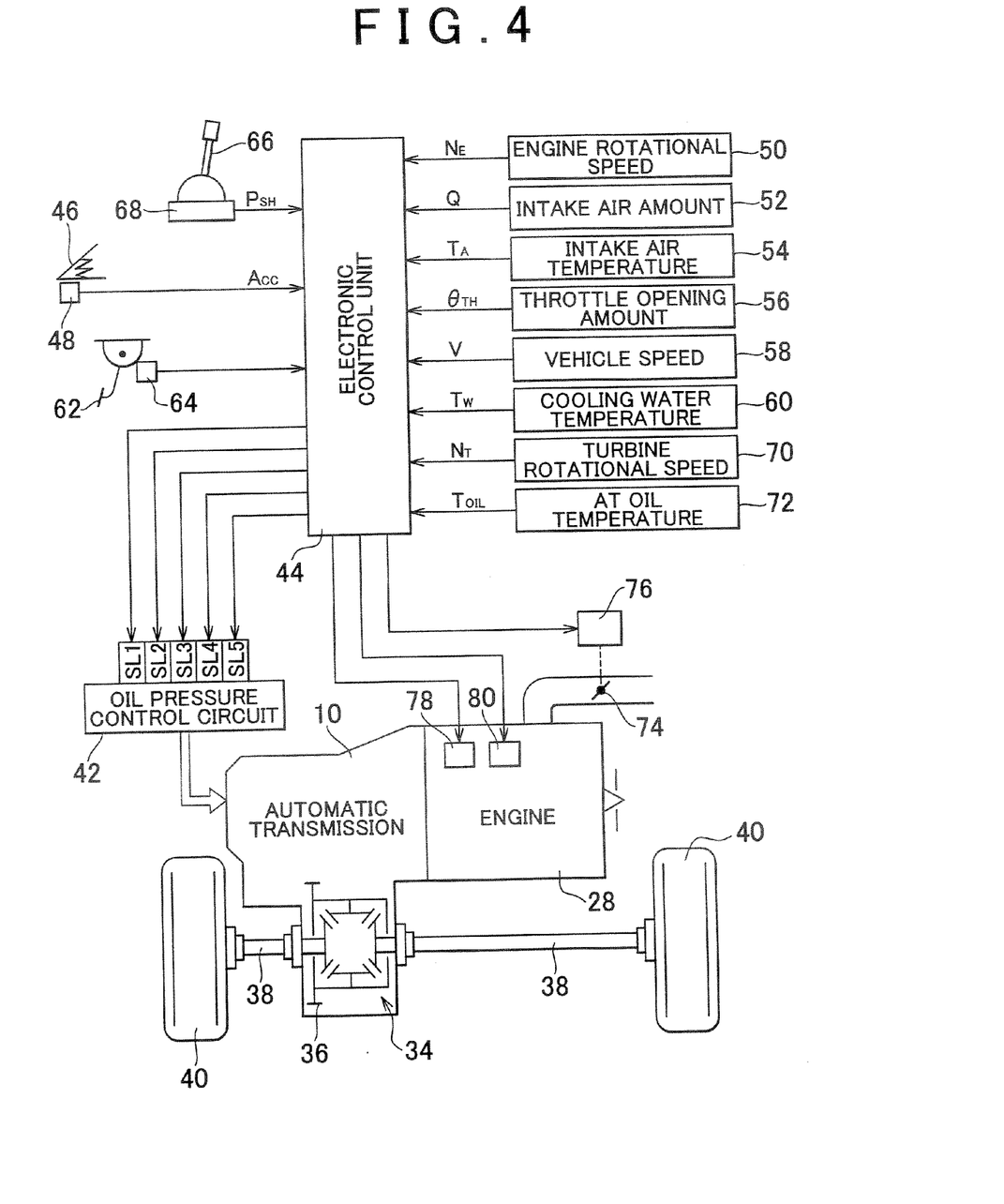
FIG. 4 is a block diagram for explanation of an electrical control system which is provided to the vehicle for controlling the power transmission device of FIG. 1, etc.

FIG. 4 is a block diagram for explanation of an electrical control system which is provided to the vehicle for controlling the power transmission device 8 and so on. This electronic control unit 44 shown in FIG. 4 is, for example, a so called microcomputer which includes ROM, RAM, a CPU, and input and output interfaces and the like. By the CPU processing input signals according to a program which is stored in the ROM in advance while utilizing the temporary storage function of the RAM, various forms of control and so on related to the power transmission device 8 are performed. Furthermore, along with the actuation amount $A_{CC}$ of an accelerator pedal 46, which is per se known as a so called accelerator opening amount, being detected by an accelerator operation amount sensor 48, a signal which represents this accelerator operation amount $A_{CC}$ is supplied to the electronic control unit 44. This accelerator pedal 46 is a pedal which is actuated by being stepped upon according to the power output amount requested by the driver, and corresponds to an accelerator actuation member; however, it would also be acceptable to arrange to consider the accelerator operation amount ACC as the requested output amount Furthermore, an electronic throttle valve 74 is provided to an intake conduit of the engine 28, and it is arranged for its throttle opening amount $\theta_{TH}$ to be varied by a throttle actuator 76 which is controlled by the above described electronic control unit 44. Furthermore, the engine 28 is provided with a fuel injection valve 78 for controlling the amount of fuel injection, and an ignition device 80 for performing ignition timing control such as an igniter or the like. And, along control of the fuel injection amount by this fuel injection valve 78 being performed by the electronic control unit 44, it is also arranged to control the ignition timing of the ignition device 80.

Moreover, to the power transmission device 8, there are also provided: an engine rotational speed sensor 50 for detecting the rotational speed $N_E$ of the engine 28; an intake air amount sensor 52 for detecting the intake air amount Q of the engine 28; an intake air temperature sensor 54 for detecting the temperature $T_A$ of the intake air; a throttle sensor 56 fitted with an idling switch for detecting the fully closed state of the electronic throttle valve 74 (its idling state) and its opening amount $\theta_{TH}$; a vehicle speed sensor 58 for detecting the vehicle speed V (corresponding to the rotational speed $N_{OUT}$ of the output rotational member 24); a cooling water temperature sensor 60 for detecting the temperature $T_W$ of the cooling water of the engine 28; a brake switch 64 for detecting the presence or absence of actuation of a foot brake pedal 62, which is the normal braking device; a lever position sensor 68 for detecting the lever position $P_{SH}$ (the actuation position) of a shift lever 66; a turbine rotational speed sensor 70 for detecting the turbine rotational speed $N_T$; an automatic transmission oil temperature sensor 72 for detecting the temperature $T_{OIL}$ of the automatic oil temperature, which is the temperature of the working oil in the oil pressure control circuit 42; and the like. From these sensors and switches, signals which represent the engine rotational speed NE, the intake air amount Q, the intake air temperature TA, the throttle valve opening amount θTH, the vehicle speed V, the engine cooling water temperature TW, the presence or absence of brake actuation, the position PSH of the shift lever 66, the turbine rotational speed NT, the temperature of the automatic transmission oil TOIL, and the like are supplied to the electronic control unit 44. It should be understood that the above described turbine rotational speed NT is equal to the rotational speed of the input shaft 22 of the automatic transmission 10 (its input shaft rotational speed NIN).

Figure 5:
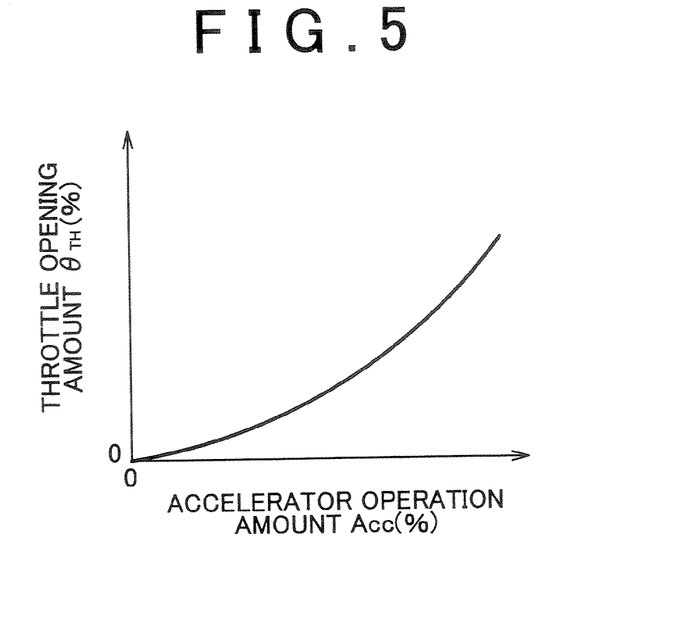
FIG. 5 is a figure showing an example of a relationship between accelerator opening amount corresponding to the actuation amount of an accelerator pedal of FIG. 4, and throttle opening amount.
Figure 6:
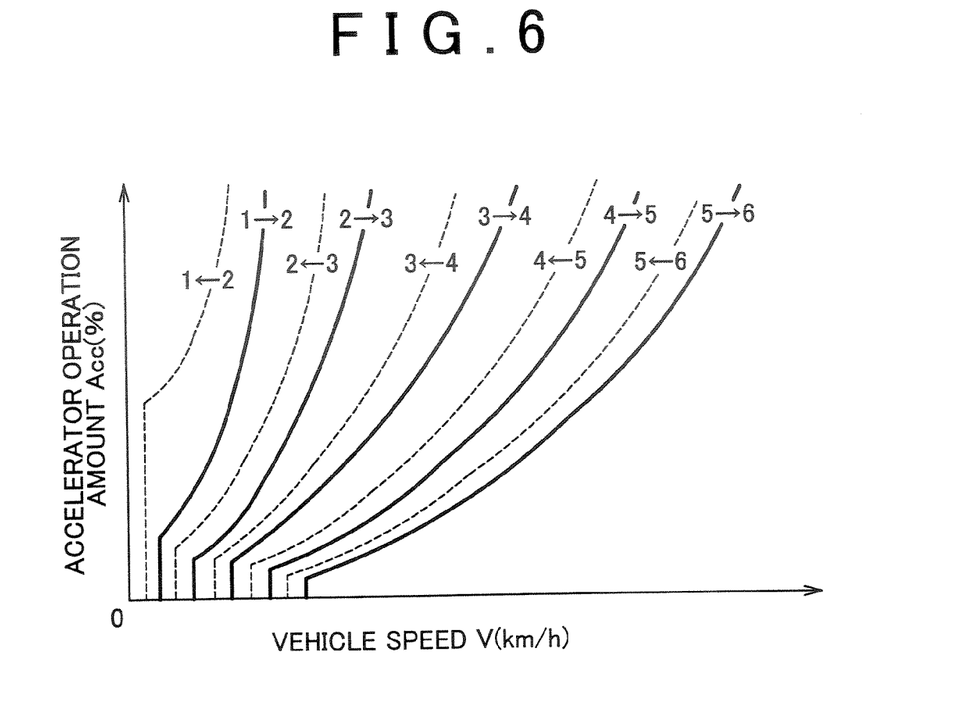
FIG. 6 is a figure showing an example of a speed change diagram which is used during the speed change control of the automatic transmission for a vehicle which is performed by the electronic control unit of FIG. 4.
Figure 7:
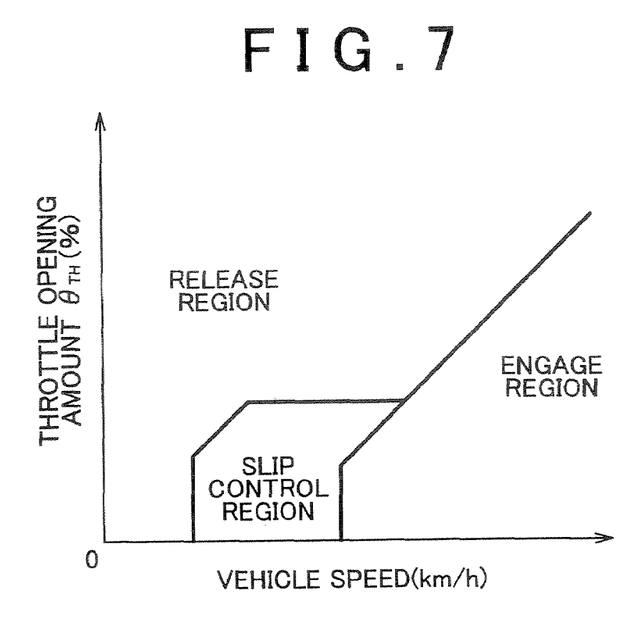
FIG. 7 is a figure showing an example of a relationship which is used in the control of the engagement state of a lock up clutch which is performed by the electronic control unit of FIG. 4.

As fundamental forms of control which are performed by this electronic control unit 44, for example, there are: throttle opening amount control in which the throttle opening amount $\theta_{TH}$ (in %) is controlled based upon the actual accelerator operation amount $A_{CC}$ (in %), according to a relationship stored in advance such as that shown in FIG. 5; speed change control in which the gear stage of the automatic transmission 10 is automatically changed over, based upon the actual accelerator operation amount $A_{CC}$ (in %) or the throttle opening amount $\theta_{TH}$ (in %) and the vehicle speed V (in km/h) or the like, according to a relationship stored in advance such as that shown in FIG. 6; control to perform engagement, release, or slippage of the lock up clutch 32 which is provided to the torque converter 30, based upon the output shaft rotational speed $N_{OUT}$ (which corresponds to the vehicle speed) and upon the throttle opening amount $\theta_{TH}$ or the like, according to a relationship stored in advance such as that shown in FIG. 7; and also fuel injection amount control, ignition timing control, and the like.

Figure 8:
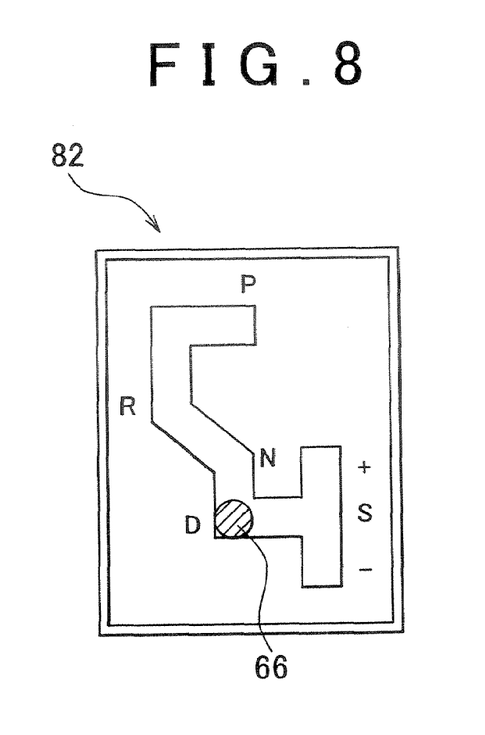
FIG. 8 is a figure for explanation of a shift actuation device to which is provided a shift lever for performing shift changeover of the automatic transmission for a vehicle which is provided to the power transmission device of FIG. 1.

FIG. 8 is a figure for explanation of a shift actuation device 82 to which the shift lever 66 is provided. This shift actuation device 82 is disposed, for example, at the side of the driving seat. The shift lever 66 is provided to this shift actuation device 82, and is arranged to be manually actuated to any one of five different lever positions: "P", "R", "N", "D", and "S".

The "P" position is a parking position for disengaging the power transmission path within the automatic transmission 10 and moreover blocking the rotation of the output rotation member 24 mechanically with a mechanical parking mechanism; the "R" position is a backwards driving position for reversing the rotational direction of the output rotation member 24 of the automatic transmission 10; the "N" position is a power transmission interception position for disengaging the power transmission path within the automatic transmission 10; the "D" position is a forward driving position in which automatic speed change control of the automatic transmission 10 is performed in a speed change range (the D range) which permits change to the first through the sixth speed stages; and the "S" position is a forward driving position in which it is possible to change the forward speed stage manually by the highest speed side speed change stage to which change can be performed being changed between a plurality of different speed change ranges or a plurality of different speed change stages. In this "S" position, there are provided a "+" position for shifting the speed change range or the speed change stage upward each time the shift lever 66 is actuated, and a "−" position for shifting the speed change range or the speed change stage downward each time the shift lever 66 is actuated.

Figure 9:
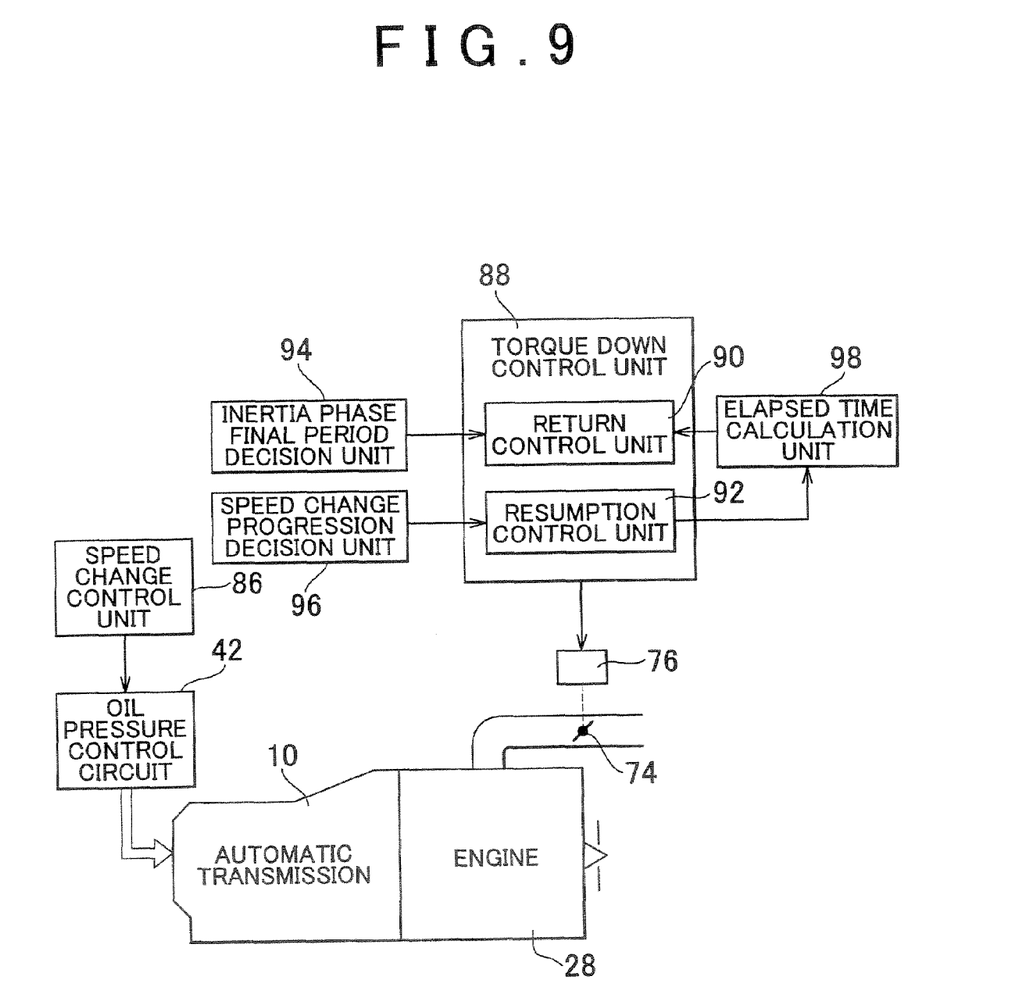
FIG. 9 is a functional block diagram for explanation of the elements of the control function with which the electronic control unit of FIG. 4 is endowed.

FIG. 9 is a functional block diagram for explanation of the elements of the control functions with which the electronic control unit 44 is endowed. A speed change control unit 86 shown in FIG. 9 controls the speed change operation by the automatic transmission 10. For example, speed change for the automatic transmission 10 is decided upon based upon the actual accelerator operation amount ACC (in %) or the throttle opening amount $\theta_{TH}$ (in %) and the vehicle speed V (in km/h), from the relationship (i.e. the speed change diagram) shown in FIG. 6 and stored in advance, and the linear solenoid valves SL1 through SL5 incorporated in the oil pressure control circuit 42 are controlled so as to obtain the speed change stage and the engaged state which have thus been decided upon.

The speed change lines in this speed change diagram of FIG. 6 are lines for making decisions as to whether or not a point defined by the actual accelerator operation amount $A_{CC}$ (in %) (shown upon the vertical axis) or the throttle opening amount $\theta_{TH}$ (in %), and by the actual vehicle speed V (shown on the horizontal axis), has crossed these lines, in other words whether or not the actual vehicle speed V has exceeded the value $V_S$ (a speed change point vehicle speed) at which the speed stage change noted upon the speed change line must be performed; these speed change lines and are stored in advance as ranges of the above described value $V_S$, in other words as ranges of speed change point vehicle speeds. In this speed change control process, it would also be acceptable to arrange for the input torque $T_{IN}$ to the automatic transmission 10 to be estimated, and for the engagement torque capacity of the friction engagement device or devices which participate in the corresponding speed change, in other words for their engagement pressures, or the line pressure which is the source pressure thereof, to be controlled to a magnitude corresponding to this input torque $T_{IN}$.

A torque down control unit 88 performs torque down control to reduce the output torque $T_E$ of the engine 28 in the inertia phase of speed changing by the automatic transmission 10 by just a predetermined torque down amount. This torque down control is performed by controlling the opening amount of the electronic throttle valve 74, in other words the throttle opening amount $\theta_{TH}$, via the throttle actuator 76. And this throttle opening amount $\theta_{TH}$ is controlled to close so that the output torque $T_H$ of the engine 28 is reduced by just the predetermined torque down amount. This torque down amount may be determined in advance at a fixed value, or may be determined based upon the vehicle state such as the input torque $T_{IN}$ of the automatic transmission 10 when deciding upon the speed change from the relationship which is stored in advance, the input shaft rotational speed $N_{IN}$ (which is equal to the turbine rotational speed $N_T$), the automatic transmission oil temperature $T_{OIL}$, and the like, and upon the operational state and so on. In particular, it would also be acceptable to arrange to perform this torque down control during power ON upshifting by the automatic transmission 10.

It should be understood that as an alternative to, or together with, the closing control of the throttle opening amount $\theta_{TH}$, it would also be possible to perform torque down control by performing retardation control of the ignition timing via the ignition device 80 or the like. Furthermore, it would also be acceptable for the above described torque down control to be performed by controlling the fuel injection amount from the fuel injection valve 78.

An inertia phase final period decision unit decides whether or not this is the final period of the inertia phase of speed changing by the automatic transmission 10. It would also be acceptable to decide upon the inertia phase final period of this speed change, based upon the input rotational speed $N_{IN}$ of the automatic transmission 10 (which is equal to the turbine rotational speed $N_T$) dropping below a decision value which is set just a predetermined value α1 higher than the synchronization rotational speed $N_{SP}$ after the speed change. In other words, if the input rotational speed $N_{IN}$ of the automatic transmission 10 satisfies the following Equation (1), then it is decided that this is the inertia phase final period, while if it does not satisfy that Equation, then it is decided that this is not the inertia phase final period.

It should be understood that this predetermined value α1 may be a constant value which is determined in advance, or may be determined based upon the input shaft rotational speed $N_{IN}$ of the automatic transmission 10 when speed change is decided upon from the relationship which is determined in advance, or the like.

$$N_{IN} < N_{SP} + \alpha 1 \quad (1)$$

The torque down control unit 88 comprises a return control unit 90 and a resumption control unit 92. This return control unit 90 performs return control for returning form the torque down control described above when the speed change ends. For example, in order to return from torque down control, taking an affirmative decision by the inertia phase final period decision unit 94 as being the starting condition, return may be executed to normal throttle control by taking the torque down amount at the start of torque down control as a base, and gradually decreasing the torque down amount until it reaches zero by gradually opening the electronic throttle valve 74 at a predetermined gradient.

The speed change progression decision unit 96 makes a decision as to whether or not, during return control from the torque down control by the above described return control unit 90, the speed change is in progression. Here by the speed change being in progression is meant that the operation for implementing the new gear stage is not stagnated or retrogressing, but is continuing to progress normally; in concrete terms, it means a state in which the input rotational speed $N_{IN}$ of the automatic transmission 10 (which is equal to the turbine rotational speed $N_T$) is continuously decreasing. It would also be acceptable to arrange for this speed change progression decision unit 96 to decide that the speed change is not progressing, based upon the input rotational speed $N_{IN}$ of the automatic transmission 10 rising above a decision value which is set just the predetermined value α1 higher than the synchronization rotational speed $N_{SP}$ after the speed change. In other words, if the input rotational speed $N_{IN}$ of the automatic transmission 10 satisfies the following Equation (2), then it is decided that the speed change is not progressing, while if it does not satisfy that Equation, then it is decided that the speed change is progressing.

It should be understood that it would also be acceptable for the predetermined value for this decision to be a value which is different from the predetermined value α1 which is used in the decision by the inertia phase final period decision unit 94. Furthermore, it would also be acceptable for the above described speed change progression decision unit 96 to be a device which makes its decision that the speed change is progressing, if the rate of change $di_{nn}ed$ of the input rotational speed $N_{IN}$ of the automatic transmission 10 continues to be greater than or equal to zero (i.e. if $di_{nn}ed \geq 0$) over a predetermined time period; and to decide that the speed change is not progressing, if this is not the case. For example, during this return control from the torque down control, the decision of this speed change progression decision unit 96 is may be considered to be negative, if the accelerator operation amount $A_{CC}$ has been increased due to the accelerator pedal 46 being further stepped upon (i.e. due to increase of its depression amount) being performed, or the like $$N_{IN} \geq N_{SP} + \alpha 1 \quad (2)$$

The resumption control unit 92 resumes the torque down control, if, during the return control from the torque down control, the actual torque down amount is deficient as compared to the torque down amount which is considered to be necessary for the speed change to progress. For example, the decision by the speed change progression decision unit 96 being negative may be taken as a resumption condition, and torque down control may be resumed by reducing the output torque $T_E$ of the engine 28 by just a predetermined torque down amount. To put it in another manner, the return control by the return control unit 90 is discontinued.

The elapsed time calculation unit 98 is a timer which can calculate the elapsed time from when the torque down control is resumed by the resumption control unit 92. Furthermore, it would also be acceptable to arrange for the return control unit 90 to start the return control by taking, as a start condition, that the decision by the inertia phase final period decision unit 94 is affirmative, and moreover that the elapsed time as calculated by this elapsed time calculation unit 98 is greater than or equal to a predetermined time period. Although, if the torque down control has been resumed by the resumption control unit 92, it is necessary again to perform return control by the return control unit 90 in order to complete the speed change, by doing this, it is possible reliably to ensure the torque down amount necessary for the progression of the speed change during at least the above described predetermined time period, and, as a result, it is possible to complete the speed change as rapidly as possible. It should be understood that this predetermined time period may be a constant value which is determined in advance, or may be obtained based upon predetermined parameters from a relationship which is determined in advance.

Furthermore, during a fault or the like of the turbine rotational speed sensor 70, the return control unit 90 starts the return control by taking, as a starting condition, that the elapsed time as calculated by the elapsed time calculation unit 98 becomes greater than a predetermined time period. It is not possible to detect the turbine rotational speed $N_T$ while the turbine rotational speed sensor 70 is faulty, and accordingly, in the control as described previously, it is not possible to make the decision as to the final period of the inertia phase; but by doing as above, it is possible reliably to ensure the torque down amount necessary for progression of speed changing during at least the above described predetermined time period.

Furthermore, the elapsed time calculation unit 98 is a device which can calculate the elapsed time from when the first starting torque down control (the torque down control before the first return control is started) of this speed change is initially started by the torque down control unit 88. It would also be acceptable for the return control unit 90 to start the first return control after the torque down control for this speed change by taking, as a starting condition, that the elapsed time as calculated by this elapsed time calculation unit 98 is greater than or equal to a predetermined time period. By doing this, in the first torque down control of this speed change, it is possible to reliably ensure the torque down amount necessary for progression of speed changing during at least the above described predetermined time period.

Figure 10:
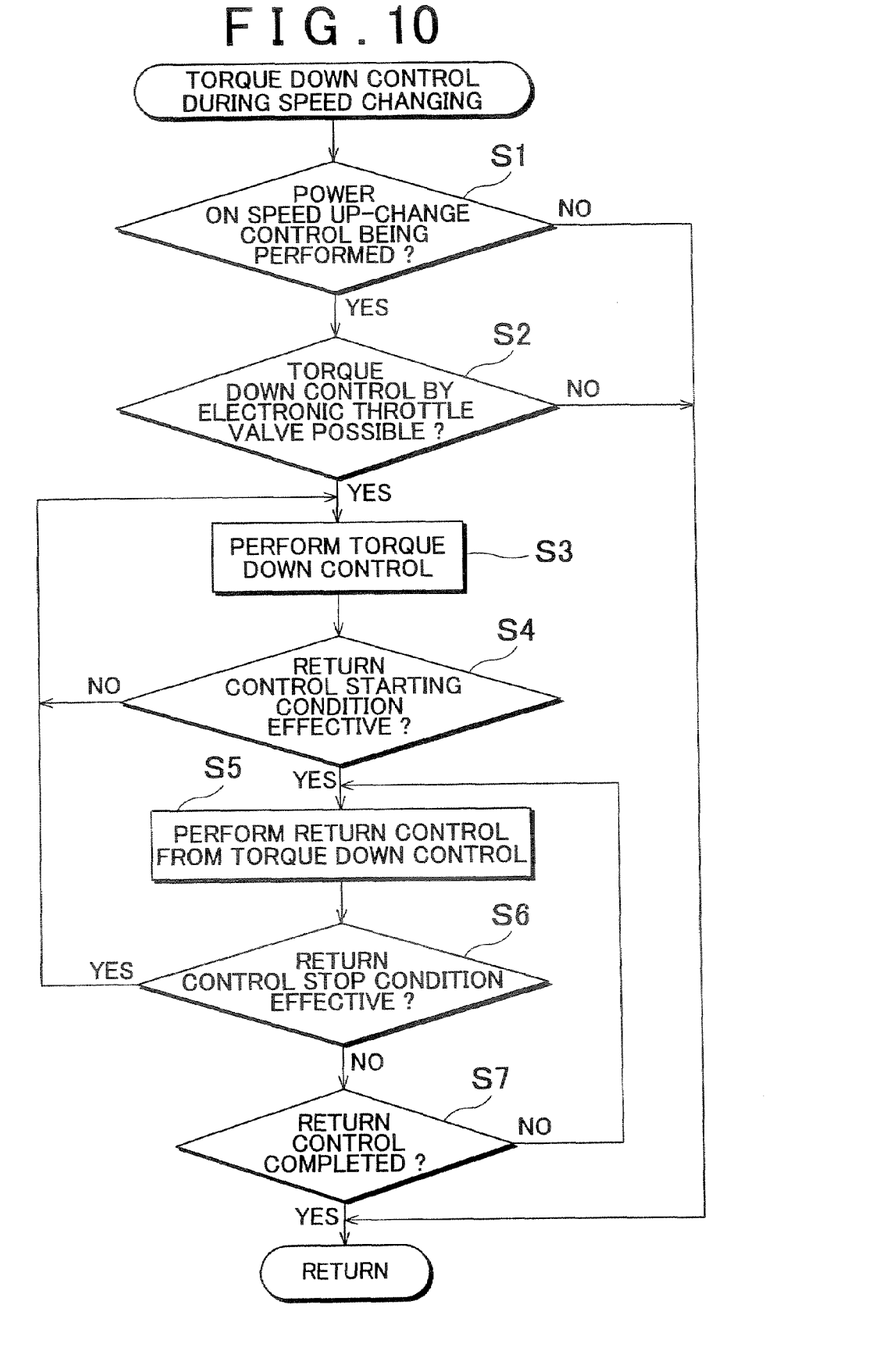
FIG. 10 is a flow chart for explanation of the essentials of torque down control when the electronic control unit of FIG. 4 is performing its speed change operation.

FIG. 10 is a flow chart for explanation of the essentials of torque down control when speed change is being performed by the electronic control unit 44; this flow chart is repeatedly executed upon a predetermined cycle.

First, in a step S1 (hereinafter the word "step" will be omitted), a decision is made as to whether or not power-on speed up-change operation is being executed by the automatic transmission 10. If the result of the decision in this S1 is negative, then this routine ends here; but if the result of the decision in S1 is affirmative, then in S2 a decision is made as to whether or not torque down control of the output torque of the engine 28 can be performed with the electronic throttle valve 74. If the result of the decision in this S2 is negative, then this routine ends here; but if the result of the decision in S2 is affirmative, then the processing of S3 and subsequently is performed.

In S3, the opening amount of the electronic throttle valve 74, in other words the throttle opening amount $\theta_{TH}$, in the inertia phase is controlled via the throttle actuator 76, and torque down control is performed by closing down the throttle opening amount $\theta_{TH}$ so that the output torque $T_E$ of the engine 28 is reduced by just a predetermined torque down amount.

Next, in a step S4 which corresponds to the operation of the inertia phase final period decision unit 94, a decision is made as to whether or not the starting condition for return control in order to return from the torque down control of S3 has become effective, in other words as to whether or not this power-on speed up-change is in its inertia phase final period. In concrete terms, a decision is made as to whether or not the turbine rotational speed $N_T$, which corresponds to the input rotational speed $N_{IN}$ of the automatic transmission 10, has dropped below a decision value which is set to be higher than the synchronization rotational speed $N_{SP}$ after the speed change by just the predetermined value α1. If the result of this decision in S4 is negative, then the processing of the above described S3 and subsequently is performed again; but, if the result of the decision in S4 is affirmative, then, in S5 which corresponds to the operation of the return control unit 90, in order to return from the torque down control, by opening the electronic throttle valve 74 gradually at a predetermined gradient, the torque down amount is gradually decreased to zero, and thereby return control is performed in order to return to normal throttle control.

Next, in S6 which corresponds to the operation of the speed change progression decision unit 96, a decision is made as to whether or not the return control stop condition for stopping the return control of S5 (i.e. the torque down control resumption condition) has become effective, in other words as to whether or not the power-on speed up-change is progressing without stagnation. In concrete terms, a decision is made as to whether or not the turbine rotational speed $N_T$, which corresponds to the input rotational speed $N_{IN}$ of the automatic transmission 10, has become higher than a decision value which is set to be higher than the synchronization rotational speed $N_{SP}$ after the speed change by just the predetermined value α1.

If the result of the decision in S6 is affirmative, then the processing of the above described S3 and subsequently is performed again; but, if the result of the decision in S6 is negative, then in S7 a decision is made as to whether or not the return control of S5 has been completed. If the result of the decision in S7 is negative, then the processing of the above described S5 and subsequently is performed again; but, if the result of the decision in S7 is affirmative, then this routine terminates here. In the control described above, S3 and S5 correspond to the operation of the torque down control unit 88, while S3 corresponds to the operation of the resumption control unit 92.

Since, in this manner, according to this embodiment, there are incorporated the inertia phase final period decision unit 94 (S4) which decides whether or not the inertia phase final period of the speed change is taking place, the return control unit 90 (S5) which performs return control in order to return from the torque down control by gradually decreasing the torque down amount, while taking as a starting condition that the decision by this inertia phase final period decision unit 94 is affirmative, the speed change progression decision unit 96 (S6) which, during the return control from the torque down control by the return control unit 90, decides whether the speed change is progressing or not, and the resumption control unit 92 (S3) which resumes the torque down control, if the result of the decision by the speed change progression decision unit 96 is negative, accordingly, by resuming the torque down control when, during return control from the torque down control, the speed change is not progressing, it is possible to ensure a sufficient torque down amount for the speed change, even if stepping down upon the accelerator pedal 46 or the like has been performed, and, as a result, drawing out of the time period until speed changing is completed is appropriately suppressed. In other words it is possible to provide a speed change control device for an automatic transmission for a vehicle which, while ensuring a sufficient torque down amount for the speed change, also implements speed changing within a short time period.

Furthermore, since there is incorporated the elapsed time calculation unit 98 which calculates the elapsed time from the resumption of the torque down control by the resumption control unit 92, and since the return control unit 90 takes, as its starting condition for starting the return control, that the result of the decision by the inertia phase final period decision unit 94 is affirmative and moreover that the elapsed time as calculated by the elapsed time calculation unit 98 is greater than or equal to a predetermined time period, accordingly, when the torque down control has been resumed, this torque down control can be continued over greater than or equal to the predetermined time period, so that, as a result, it is possible reliably to ensure the required torque down amount for speed changing, and drawing out of the time period until speed changing is completed is reliably suppressed.

Moreover, since the inertia phase final period decision unit 94 is a device which decides upon the inertia phase final period of the speed change based upon the input rotational speed $N_{IN}$ of the automatic transmission 10 dropping below the decision value which is set just the predetermined value α1 higher than the synchronization rotational speed $N_{SP}$, and the speed change progression decision unit 96 is a device which decides that the speed change is not progressing, based upon this input rotational speed $N_{IN}$ of the automatic transmission 10 rising above that decision value, accordingly, as a result, it is possible to decide upon the inertia phase final period of the speed change, and upon its progression, in a practical manner.

Still further, since the speed change progression decision unit 96 is a device which decides that the speed change is not progressing, based upon the fact that the state of the rate of change di$_{nn}$ed of the input rotational speed $N_{IN}$ of the automatic transmission 10 being greater than zero has continued for a predetermined time period, as a result, it is possible to decide upon the progression of the speed change in a practical manner.

Yet further, since the torque down amount by which the output torque $T_E$ of the engine 28 is reduced by the torque down control unit 88 is determined based upon the input torque $T_{IN}$ of the automatic transmission 10 and/or the input rotational shaft rotational speed $N_{IN}$ from a relationship which is determined in advance, accordingly, as a result, during upshift speed changing, the output torque $T_E$ of the engine 28 is appropriately reduced during the inertia phase.

Although a particular appropriate embodiment of the present invention has been explained above in detail based upon the drawings, the present invention is not to be considered as being limited thereby; it may be implemented in various other ways.

For example although, in the embodiment described above, an example was explained in which the present invention was applied to the case of controlling the automatic speed change gear mechanism 10 which had six forward speed stages provided by combinations of the three planetary gear devices 12, 16, and 18, this is not to be considered as being limitative of the present invention; the present invention could also be widely applied to any automatic transmission which outputs rotation transmitted from a power source after changing the rotational speed thereof.

Furthermore although, in the embodiment described above, the example was explained in which the present invention was applied to the power transmission device 8 which, as a vehicle power source, was provided with the engine 28 which was an internal combustion engine which generated drive force by combustion of fuel injected into its cylinders, it would also be possible to apply the present invention to a hybrid vehicle which uses, as power source, an internal combustion engine operated by combustion of fuel and an electric motor operated by electrical energy in a complementary manner, or to an electric automobile driven by an electric motor or the like.

Furthermore although, in the embodiment described above, the inertia phase final period decision unit 94 is a device which decides upon the inertia phase final period of the speed change based upon the input rotational speed $N_{IN}$ of the automatic transmission 10 dropping lower than a decision value which is set just the predetermined value $\alpha 1$ higher than the synchronization rotational speed $N_{SP}$, and the speed change progression decision unit 96 is a device which decides than the speed change is not progressing based upon the input rotational speed $N_{IN}$ of the automatic transmission 10 rising above that decision value, it would also be acceptable for the decisions by these control units to be performed based upon, for example, the engagement pressure of an oil pressure type friction engagement device which participates in the speed change, or the like.

While the invention has been described with reference to embodiments thereof, it is to be understood that the invention is not limited to the embodiments or constructions. To the contrary, the invention is intended to cover various modifications and equivalent arrangements. In addition, while the various elements of the embodiments are shown in various combinations and configurations, which are exemplary, other combinations and configurations, including more, less or only a single element, are also within the spirit and scope of the invention.

What is claimed is:

1. A speed change control device for an automatic transmission for a vehicle which speed changes and outputs the rotation output transmitted from a power source and, in an inertia phase of upshift speed changing, performs torque down control by reducing the output torque of the power source by a predetermined amount comprising:
    an inertia phase final period decision unit which decides whether or not the final period of the inertia phase is currently occurring;
    a return control unit which, if it has been decided by the inertia phase final period decision unit that the inertia phase is in its final period, performs return control by gradually decreasing the amount of decrease of output torque by the torque down control;
    a speed change progression decision unit which, during the return control, decides whether or not the speed change is progressing; and
    a resumption control unit which resumes the torque down control, if it has been decided by the speed change progression unit that the speed change is not progressing.

2. A speed change control device for an automatic transmission for a vehicle according to the claim 1, further comprising an elapsed time calculation unit which calculates the elapsed time from the resumption of the torque down control by the resumption control unit, and wherein the return control unit takes, as a starting condition for the return control, that it is decided by the inertia phase final period decision unit that the inertia phase is in its final period, and moreover that the elapsed time as calculated by the elapsed time calculation unit has become greater than or equal to a predetermined time period.

3. A speed change control device for an automatic transmission for a vehicle according to the claim 1, wherein:
    the inertia phase final period decision unit decides that the inertia phase of the speed change is in its final period, based upon an input rotational speed to the automatic transmission dropping below a decision value which is set just a predetermined value higher than a synchronization rotational speed; and
    the speed change progression decision unit decides that the speed change is not progressing, based upon the input rotational speed to the automatic transmission rising above the decision value.

4. A speed change control device for an automatic transmission for a vehicle according to the claim 1, wherein the speed change progression decision unit decides that the speed change is not progressing, based upon the state in which a rate of change of an input rotational speed to the automatic transmission is greater than or equal to zero being maintained for a predetermined time period.

5. A speed change control device for an automatic transmission for a vehicle according to the claim 1, wherein the torque down amount is determined from a relationship determined in advance, based upon an input torque and/or an input shaft rotational speed to the automatic transmission.

6. A speed change control method for an automatic transmission for a vehicle which speed changes and outputs the rotation output transmitted from a power source and, in an inertia phase of upshift speed changing, performs torque down control by reducing the output torque of the power source by a predetermined amount, comprising processes of:
    deciding whether or not the final period of the inertia phase is currently occurring;
    if it has been decided that the inertia phase is in its final period, performing return control by gradually decreasing the amount of decrease of output torque by the torque down control;
    during the return control, deciding whether or not the speed change is progressing; and
    resuming the torque down control, if it has been decided that the speed change is not progressing.

7. A speed change control method for an automatic transmission for a vehicle according to the claim 6, further comprising a process of calculating an elapsed time from the resumption of the torque down control, and wherein it is taken, as a starting condition for the return control, that it is decided that the inertia phase is in its final period, and moreover that the calculated elapsed time has become greater than or equal to a predetermined time period.

8. A speed change control method for an automatic transmission for a vehicle according to the claim 6 or claim 7, further comprising processes of:
    deciding that the inertia phase of the speed change is in its final period, based upon an input rotational speed to the automatic transmission dropping below a decision value which is set just a predetermined value higher than a synchronization rotational speed; and
    deciding that the speed change is not progressing, based upon the input rotational speed to the automatic transmission rising above the decision value.

9. A speed change control method for an automatic transmission for a vehicle according to the claim 6, further comprising a process of deciding that the speed change is not progressing, based upon the state in which a rate of change of an input rotational speed to the automatic transmission is greater than or equal to zero being maintained for a predetermined time period.

10. A speed change control method for an automatic transmission for a vehicle according to the claim 6, further comprising a process of determining the torque down amount from a relationship determined in advance, based upon an input torque and/or an input shaft rotational speed to the automatic transmission.

* * * * *